Figure 1:
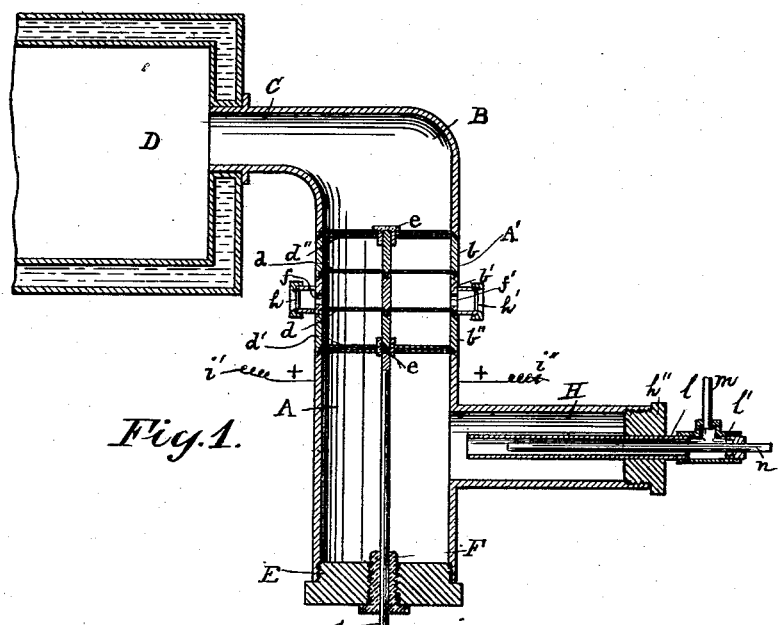

No. 828,268. PATENTED AUG. 7, 1906.
H. S. BLACKMORE.
PROCESS OF MAKING SULFUR TRIOXID.
APPLICATION FILED DEC. 19, 1904.

2 SHEETS—SHEET 1.

WITNESSES
C. C. Wright
H. N. Jenkins

INVENTOR
Henry Spencer Blackmore

No. 828,268. PATENTED AUG. 7, 1906.
H. S. BLACKMORE.
PROCESS OF MAKING SULFUR TRIOXID.
APPLICATION FILED DEC. 19, 1904.

2 SHEETS—SHEET 2.

WITNESSES.

H. N. Jenkins

Frank H. Hoyt

INVENTOR.

Henry Spencer Blackmore

UNITED STATES PATENT OFFICE.

HENRY SPENCER BLACKMORE, OF MOUNT VERNON, NEW YORK.

PROCESS OF MAKING SULFUR TRIOXID.

No. 828,268.  Specification of Letters Patent.  Patented Aug. 7, 1906.

Original application filed May 11, 1901, Serial No. 59,814. Divided and this application filed December 19, 1904. Serial No. 237,449.

*To all whom it may concern:*

Be it known that I, HENRY SPENCER BLACKMORE, a citizen of the United States, residing at Mount Vernon, in the county of Westchester and State of New York, have invented new and useful Improvements in Processes of Making Sulfur Trioxid, of which the following is a specification, being a division from my application, Serial No. 59,814, filed May 11, 1901.

The object of my invention is to produce compounds containing sulfur, such as sulfur trioxid, ($SO_3$,) which evolve heat in their formation in such a manner that the temperature is prevented from rising to a point at which the compound desired is dissociated, whereby its continuous production is prohibited; and it consists in simultaneously producing substances which absorb heat on their formation and the sulfur compound desired, the ingredients being so apportioned, adjusted, and disposed that the heat evolved during the formation of the sulfur compound is abstracted by the substance absorbing heat during its production to such a degree that the temperature is prevented from reaching the dissociating-point of the compound desired. This abstraction or absorption of heat by chemical means I term "chemical refrigeration."

My invention relates specifically to certain new and novel features and steps for performing a reaction between sulfur dioxid and gaseous oxidizing agents in the formation of sulfur trioxid, whereby a temperature sufficient to dissociate sulfur trioxid or preclude its formation is prohibited by abstracting the heat evolved in the formation of the sulfur trioxid by a simultaneously-produced substance which absorbs heat on its formation, the ingredients being so apportioned and disposed that the heat evolved by one is taken up by the other to such a degree as to practically prevent the accumulation of heat to an injurious point. By properly apportioning the reacting ingredients the process of making sulfur trioxid may be carried on continuously, the reaction being induced by the direct application of controlled heat in preference to heat dislodged, generated, or produced through the mediation of catalytic or condensation action of finely-divided metal or so called "contact" substances, (*Ganot's Physics*,) such as platinized asbestos, &c., on gases present, which soon become inoperative by absorption, saturation of gases, or destructive action of injurious contaminations and can only be regenerated by expensive chemical process to regain their activity.

In carrying out my invention for the production of sulfur trioxid I proceed as follows, reference being had to the accompanying drawings, which illustrate a preferred form of apparatus which I employ for the purpose.

Figures 2, 3:
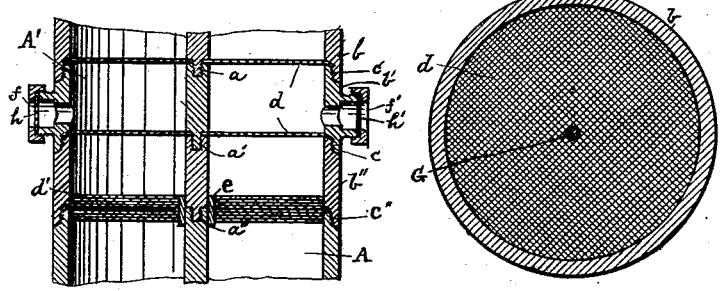
Figure 4:
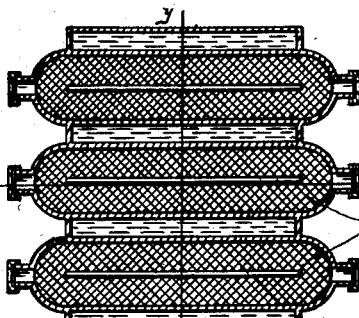
Figure 5:
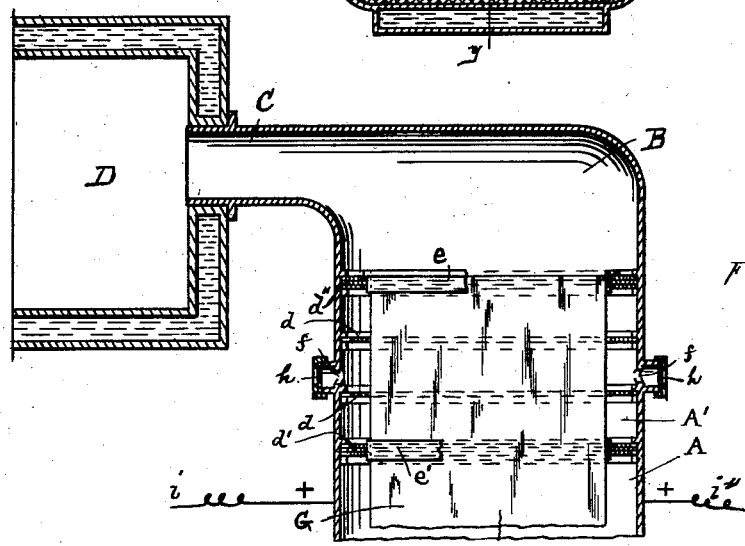
Figure 6:
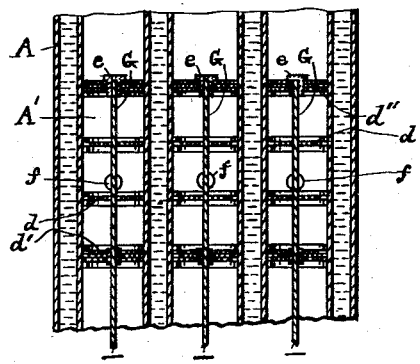

Referring to the drawings, Figure 1 is a vertical longitudinal section of my apparatus. Fig. 2 is an enlarged vertical section showing the electric diaphragms and the connections of the transforming-chamber. Fig. 3 is a cross-section of one of the rings of the electric connection of the transforming-chamber and an electric gauze diaphragm connected therewith. Fig. 4 is a transverse section of a modified form of apparatus, showing the transforming-compartments of elongated form and provided with water-jackets. Fig. 5 is a vertical longitudinal section of the apparatus on the lines $x\,x$, Fig. 4; and Fig. 6 is a transverse vertical section on the lines $y\,y$, Fig. 4.

Similar letters refer to corresponding parts in the several views.

The letter A designates a transforming-chamber of cylindrical or other form, provided at its top with an elbow B and pipe C, the latter connected with a jacketed condenser D in any desired air-tight manner.

The lower end of the transforming-chamber A is provided with a detachable head E, having a central stuffing-box or screw-threaded plug F, of insulating material, connected therewith and in which is fitted a rod or electric connection G, the upper portion of which is formed in sections having screw-threaded connections, as shown at $a\,a'\,a''$ in Fig. 2. The transforming-chamber A, like the electric connection G, is partly composed of sections, as shown at $b\,b'\,b''$, (see Figs. 1 and 2,) the said sections being joined together by the threaded ends $c\,c'\,c''$.

A series of metallic-gauze diaphragms $d$, preferably of gold-plated copper, are arranged within the transforming-chamber A, the said diaphragms being securely held in relative positions by the abutting shoulders of the screw-threaded ends of the transforming-chamber rings and of the central connection thereof. The upper and lower diaphragms $d'$ and $d''$ are arranged in several thicknesses, forming a heat-absorber and flash-preventer and insulated from the electric connection G, as shown at e e', for the purposes hereinafter fully described.

Peep-holes f f', having mica fronts or covers h h', are located at the opposite sides of the combustion or transforming compartments A' to enable the attendant to view the interior thereof and provide for regulating the apparatus as occasion may require.

The letters i and i' and i'' designate electric wires, which are respectively connected with the electric conductor G and the walls of the transforming-chamber A by ordinary means.

The lower part of the transforming-chamber is provided horizontally with a pipe-section H, having a detachable end or head h'', within which is tightly fitted a tube l, the latter provided with a T-head l' and an inlet-pipe m, while within the stem of the T-head and the tube l is arranged a pipe n for the purposes hereinafter fully specified.

In constructing an apparatus for carrying out my invention on a manufacturing scale it is found advisable not to have the heating gauze diaphragms d d of a width greater than two inches from the central conductor on account of the tendency of the same to sag, become overheated, and fuse. I therefore prefer the form of apparatus as shown in Figs. 4, 5, and 6, wherein it is seen that the transforming-compartments are of elongated form and the central conductor instead of a rod consists of a strip of metal. This form of transforming apparatus is adapted to carry a heated gauze diaphragm of from three to four feet in length and four inches in width— i. e., two inches on either side of the central conductor which extends through the center of the transforming-compartment to within two inches of either end, as shown in Fig. 4. In constructing a battery of this form of apparati it is advisable to separate the individual sections from each other by means of a water-jacket z z, which assists in maintaining the gases in a refrigerated condition, whereby the reaction is regulated by supply of heat thereto by means of heated gauze diaphragms. In all other particulars this preferred and modified form of apparatus is illustrated in Figs. 4, 5, and 6 in parts corresponding to Figs. 1, 2, and 3, except in form and construction, the same letters of reference referring to corresponding parts in the several views.

In the operation of my invention for the production of sulfur trioxid I introduce the sulfur dioxid through the pipe m and gradually introduce a gaseous oxidizing compound, such as carbon dioxid and nitrogen tetroxid, through the pipe n, allowing the two to enter in about equivalent proportions before reaction, whereupon they become thoroughly mixed in the lower part of transforming-chamber A. The mixed gases then pass up through the insulated gauze flash-preventer d' into the transforming-compartment A'. A current of electricity is then passed through the connections i i' i'', the same passing through the diaphragms d d, heating them in proportion to the strength of the current, either low or to whiteness, the temperature being somewhat gaged by the color of the diaphragm, which can be observed through the mica-closed peep-holes f f'. As the mixture of sulfur dioxid, carbon dioxid, and nitrogen tetroxid comes in contact with the heated gauze diaphragms a reaction takes place which may be illustrated by the following chemical formula or equation:

$$3SO_2 + CO_2 + 2NO_2 = 3SO_3 + CO + 2NO.$$

It will be observed that the reaction which here takes place is of endothermic nature and the oxidizing compounds are reduced, producing by-product of endothermic or heat-absorbing character—that is to say, heat has to be supplied to the mixture to maintain the reaction or oxidation and can only reach the point of dissociation of the sulfur trioxid by the excessive application of external heat. In inducing the reaction between sulfur dioxid and a gaseous oxidizing compound I heat the igniting gauze diaphragms d d to a bright red by passing a current of electricity therethrough and then gradually pass the sulfur dioxid and gaseous oxidizing compound, such as carbon dioxid and nitrogen tetroxid, through the same. As the mixture of sulfur dioxid, carbon dioxid, and nitrogen tetroxid passes through the diaphragms d d, heated to bright redness, a reaction takes place. The carbon dioxid and nitrogen tetroxid at that temperature assume oxidizing properties and give up a portion of their oxygen to the gaseous sulfur dioxid, producing sulfur trioxid, carbonic oxid, and nitrogen tetroxid, which products are rapidly conveyed from the heated sphere in juxtaposition to the diaphragm by the current of flowing gas therethrough. Care must be taken not to pass the mixture of carbon dioxid and sulfur dioxid through the diaphragm at a greater speed than will cool the diaphragm below a bright red heat, as the reduction of the carbon dioxid to carbonic oxid and simultaneous oxidation of sulfur dioxid to sulfur trioxid requires the addition of heat, for the reason that the by-product, carbonic oxid, absorbs a large portion of latent heat, which heat had previously been liberated by oxidation to carbon dioxid. It is well known that the oxidation of sulfur dioxid by means of oxygen per se liberates heat in such quantity as to eventually accumulate to a temperature which prevents the formation of sulfur trioxid unless the sensible heat is mechanically abstracted. By my process the liberation of sensible heat in the oxidation of sulfur dioxid is entirely prevented, so that the sulfur dioxid becomes oxidized by what is termed an "endothermic reaction"—i. e., heat is absorbed during the reaction instead of being liberated and must naturally be supplied thereto to maintain it. The reason for this fact is that during the combination of carbon and oxygen in the production of carbon dioxid more sensible heat is liberated than is liberated by the union of oxygen and sulfur dioxid. Therefore by oxidizing sulfur dioxid with this gaseous oxidizing agent the heat by union of which has been disengaged must be added to perform and maintain the reaction or oxidation of the sulfur dioxid therewith, and consequently the temperature cannot rise to the dissociating-point of sulfur trioxid unless the heat is supplied in excessive quantities from an exterior source, and, in fact, the amount of heat absorbed in reducing carbon dioxid to carbonic oxid in the oxidation of sulfur dioxid, producing sulfur trioxid, is so much in excess of the heat which would be liberated by the direct union of sulfur dioxid with oxygen that the carbon dioxid employed as oxidizing agent may be mixed with free oxygen or nitrogen oxid, which under normal conditions produce an exothermic reaction with sulfur dioxid in such proportion as to neutralize the heat-absorbing nature of the carbonic oxid as produced by the decomposition of carbon dioxid in the process. It will be observed that the heated sphere in juxtaposition to the diaphragm is maintained at a bright red, at which temperature carbon dioxid acts as an oxidizing agent. The products passing therethrough are rapidly conveyed outside of the sphere at which heat is supplied—i. e., in juxtaposition to the diaphragm—so that decomposition by by-products is thus prevented thereafter. The proportion of gases in case sulfur dioxid and carbon dioxid are employed is preferably in volume of two parts of carbon dioxid to one part of sulfur dioxid, the object being to have an excess of carbon dioxid, the presence of which prevents the reduction of sulfur trioxid by the carbonic-oxid by-product as the gases cool after reaction. After the sulfur trioxid and carbonic oxid are thus produced by means of endothermic reaction they are conveyed through the water-jacketed condenser D, where the sulfur trioxid is condensed, and the carbonic oxid and nitric oxid, with excess of carbon dioxid, conducted therefrom, the carbonic oxid and nitric oxid oxidized by burning to carbon dioxid and nitrogen tetroxid and employed again, as before. The carbonic oxid and nitric oxid in this process merely act as a carrier of oxygen, whereby the oxidation of sulfur dioxid is performed without liberation of sensible heat. The reaction which would take place during the oxidation of carbonic oxid and nitric oxid with the evolution of heat which it had absorbed during the oxidation of sulfur dioxid to sulfur trioxid in the process of chemical refrigeration may be illustrated by the following chemical formula or equation:

$$CO + 2NO + 3O = CO_2 + 2NO_2.$$

By thus employing the nitrogen oxids and carbon oxids the process of making sulfur trioxid may be carried on continuously by employing sulfur dioxid and oxygen in separate compartments with an intermediate condenser, the nitrogen tetroxid and carbon dioxid acting as oxidizing agents to the sulfur trioxid in the production of sulfur trioxid and the by-product, carbonic oxid, being endothermic or heat-absorbing in its formation, is dissociated in the manner described, abstracting the heat which would normally be evolved on the oxidation of sulfur dioxid, thus preventing an accumulation of heat to a temperature at which the formation of sulfur trioxid would be prevented. The current of gases introduced passing rapidly through the apparatus carries the principal product of reaction—i. e., sulfur trioxid—quickly through and away from the heated gauze diaphragms, and at the same time it is cooled by the surrounding body of gases and then passes through the flash-preventer $d''$, which consists of a number of layers of gauze insulated, as before described, from the central conductor, and thus also acts as a strainer or absorbent of any excess of heat absorbed from the heated diaphragms and conveys it away, the sulfur trioxid being finally condensed in the jacketed condenser D, from which it may be removed from time to time as desired, while the carbonic oxid or other reduced oxidizing gaseous medium may be reoxidized and employed in future operations.

It will be observed that the transforming-compartment A', in which the electrically-heated diaphragms are located, is protected at the inlet and outlet portions with heavy insulated gauze sections, which prevents the ignited mixture of gases in said compartment from conveying the flash or oxidizing reaction outside of the compartment and admits of controlling the temperature and the product by the rapidity of the admission of gases thereto during transformation. The electric diaphragms $d\ d$ being maintained at a uniform temperature by carefully regulating the temperature of the electric diaphragms $d\ d$ in conformity with the rapidity of flow of gases introduced the production of sulfur trioxid may be carried on continuously without interruption.

It is obvious that I can introduce any other gaseous oxidizing agent with the carbon dioxid, such as nitrogen trioxid, free oxygen, &c., mixed with the sulfur dioxid, the ingredients being so apportioned that the heat evolved in the oxidation of the sulfur dioxid will be absorbed by the decomposition or reduction of the carbon dioxid to carbonic oxid in the formation of sulfur trioxid to such a degree as to prevent the accumulation of heat or elevation of temperature to the dissociating-point of sulfur trioxid, at which time the oxidation of sulfur dioxid would be precluded, and inducing a reaction between the same by supplying heat thereto.

It is obvious that I can introduce any other compound which will yield oxygen to oxidize sulfur dioxid to sulfur trioxid under the existing conditions, regardless of the fact that the said process of oxidation may be exothermic in its character independently and separately so long as I associate such exothermic process with a compound capable of likewise oxidizing sulfur dioxid to sulfur trioxid, with the difference that heat is absorbed or taken up by the by-product or residue of the oxidation, or, in other words, by endothermic reaction instead of exothermic, as in the first case, and provided the oxidizing ingredients of exothermic nature do not evolve heat to such excess of that absorbed by the oxidizing ingredients of endothermic nature that the heat will accumulate or soar up to a temperature at which the oxidation of sulfur dioxid would be precluded or at which sulfur trioxid dissociates. From this it will be seen that I can employ any exothermic method of oxidizing sulfur dioxid to sulfur trioxid, such as exposing a mixture of sulfur dioxid and oxygen to a temperature at which they combine, or sulfur dioxid and nitrogen oxid, or sulfur dioxid and any other oxidizing agent, provided I associate with such operation other oxidizing agents the by-products of which absorb heat to a degree which will maintain the temperature of the reacting ingredients below the dissociating-point of sulfur trioxid by chemical refrigeration, such as supplying to the oxidizing ingredients of exothermic nature carbon dioxid, which when imparting its oxygen to sulfur dioxid in the formation of sulfur trioxid will absorb the heat evolved in the associated exothermic reaction, as aforesaid, as well as that which would be evolved from the union of the oxygen displaced from the carbon dioxid, and forming its equivalent of sulfur trioxid.

It can be readily seen that the heated diaphragms $d\ d$ in the transforming-compartment A' serve to supply the heat whereby a reaction is induced between the sulfur dioxid and the gaseous oxidizing compound as it comes in contact therewith, and the excess of heat absorbed therefrom by the passing gases or products of reaction is primarily removed or absorbed by the rapid-flowing gases admitted at the heat-absorbing diaphragm $d''$.

It is obvious that by my process the oxidation of sulfur dioxid produced by the reaction between sulfur dioxid and a gaseous oxidizing compound is induced and maintained by a positive and controlled means—viz., the electrically-heated gauze diaphragm through which the mixture of gases have to pass—and therefore is not subject to the difficulties found or met with in employing catalytic or contact substances which soon become inoperative by absorption or saturation of gases and can only be reused by expensive process of separation and regeneration.

The products of reaction in the case of the employment of carbon dioxid and nitrogen tetroxid as an oxidizing agent with sulfur dioxid are sulfur trioxid and carbonic oxid and nitric oxid, which products are conveyed through the condenser D, where the sulfur trioxid condenses and the by-product—viz., carbonic oxid and nitric oxid—reconducted to a reservoir, from which it can be again employed from time to time by oxidizing the same, mixing it with more sulfur dioxid, and conveying the mixture through the apparatus and the transforming-compartment A', whereby the process may be carried on in a continuous and uninterrupted manner.

I do not desire to confine myself to any particular gaseous oxidizing compound, but have found the nitrogen tetroxid and carbon dioxid mixture to be very efficient, the principal object being to oxidize sulfur dioxid to sulfur trioxid by the action of a gaseous oxidizing compound, the reaction of which on the sulfur dioxid is of endothermic nature.

The term "gaseous" as employed herein with reference to oxidizing agents for transforming sulfur dioxid into sulfur trioxid is intended to include a vaporized oxidizing compound capable of producing sulfur trioxid from sulfur dioxid, as well as an oxidizing gas *per se*.

As the sulfurous gases first come in contact with the gold-plated copper gauze it combines therewith, forming a coating of gold-copper sulfid, which prevents further action on the metal parts and isolates the metal from further contact with the surrounding gases or fluids, but does not prevent the passage of heat therethrough for the purpose of inducing reaction or combination between the sulfur dioxid and oxygen when the gauze is subjected to the action of an electric current. This coating remains, isolating the metal parts from the gases and preventing further contact therewith.

It can be readily seen that by employing my process for making sulfur trioxid employing chemical refrigeration sulfur may be readily oxidized from its dioxid to its trioxid condition directly and continuously, for the reason that the heat which would naturally be evolved during the peroxidation of the sulfur is thus abstracted and prevented from accumulating to a point at which the sulfur peroxidation would be precluded.

Having now described my invention, what I claim as new, and desire to secure by Letters Patent, is—

1. The process, which consists in oxidizing a substance which upon oxidation will form a sulfur and oxygen containing compound while subjecting the reacting ingredients to chemical refrigeration of another reaction.

2. The process, which consists in oxidizing a substance which upon oxidation will form sulfur trioxid while subjecting the reacting ingredients to chemical refrigeration of another reaction.

3. The process, which consists in oxidizing a substance which, upon oxidation, will form a sulfur and oxygen containing compound, by the action of an oxygen-yielding substance while subjecting the reacting ingredients to chemical refrigeration of another reaction.

4. The process, which consists in oxidizing a substance which, upon oxidation, will form a sulfur and oxygen containing compound, by the action of oxygen of a substance containing oxygen while subjecting the reacting ingredients to chemical refrigeration of another reaction.

5. The process, which consists in oxidizing a substance which, upon oxidation, will form a sulfur and oxygen containing compound, by the action of an oxid of nitrogen while subjecting the reacting ingredients to chemical refrigeration of another reaction.

6. The process, which consists in oxidizing a substance which, upon oxidation, will form sulfur trioxid, by the action of an oxygen-yielding substance while subjecting the reacting ingredients to chemical refrigeration of another reaction.

7. The process, which consists in oxidizing a substance which, upon oxidation, will form sulfur trioxid, by the action of oxygen of a substance containing oxygen while subjecting the reacting ingredients to chemical refrigeration of another reaction.

8. The process of making sulfur trioxid, which consists in oxidizing sulfur dioxid by the action of an oxid of nitrogen while subjecting the reacting ingredients to chemical refrigeration of another reaction.

9. The process, which consists in oxidizing a substance which, upon oxidation, will form sulfur trioxid, by the combined action of an oxid of nitrogen and a gaseous oxidizing agent capable of yielding a heat-absorbing by-product, and so proportioning and disposing the oxidizing ingredients that the formation of sulfur trioxid will continue and be maintained at a temperature below its dissociating-point, by chemical refrigeration.

10. The process of making sulfur trioxid, which consists in oxidizing sulfur dioxid by the combined action of an oxid of nitrogen and carbon dioxid, and so proportioning and disposing the oxidizing ingredients that the formation of sulfur trioxid will continue and be maintained at a temperature below its dissociating-point, by chemical refrigeration.

11. The process of making sulfur trioxid, which consists in oxidizing sulfur dioxid by the action of an oxid of nitrogen while associated with ingredients capable of producing an independent and inert substance with the absorption of heat.

12. The process, which consists in oxidizing a substance which, upon oxidation, will form sulfur trioxid, by the action of an oxid of nitrogen in the presence of a substance capable of being dissociated by the action of and with the absorption of heat.

13. The process of making sulfur trioxid, which consists in oxidizing sulfur dioxid by the action of an oxid of nitrogen in the presence of a substance capable of being dissociated by the action of and with the absorption of heat.

14. The process, which consists in oxidizing a substance which, upon oxidation, will form sulfur trioxid, by the action of nitrogen tetroxid in the presence of a substance capable of being dissociated by the action of and with the absorption of heat.

15. The process of making sulfur trioxid, which consists in oxidizing sulfur dioxid by the action of nitrogen tetroxid in the presence of a substance capable of being dissociated by the action of and with the absorption of heat.

16. The process, which consists in oxidizing a substance which, upon oxidation, will form sulfur trioxid, by the action of an oxid of nitrogen and simultaneously producing a substance capable of absorbing heat during its formation, and apportioning and disposing the ingredients so that the heat which would result by the oxidation of the sulfur by action of the nitrogen oxid, is absorbed by the other to such a degree that the generation of a temperature sufficient to dissociate sulfur trioxid is avoided.

17. The process, which consists in simultaneously oxidizing a substance which, upon oxidation, will form sulfur trioxid, by the action of an oxid of nitrogen which evolves heat, and carbon dioxid which absorbs heat, and so proportioning and associating the oxidizing agents that the reacting ingredient absorbing heat will be sufficient to maintain the temperature of the reacting ingredients below the dissociating-point of sulfur trioxid.

18. The process, which consists in controlling the evolution of sensible heat while oxidizing a substance which, upon oxidation, will form sulfur trioxid, by the action of an oxid of nitrogen, by removing the heat evolved from the sphere of formation of the sulfur trioxid by associating therewith substances capable of chemically absorbing heat during reaction, separating the compound containing the chemically-absorbed energy from the sulfur trioxid, discharging the energy therefrom thereafter by chemical action, and producing a substance capable of being reused as a chemical refrigerant in the further continuance of the process.

19. The process, which consists in oxidizing a substance which, upon oxidation, will form sulfur trioxid, by the action of an oxid of nitrogen and carbon dioxid.

20. The process of making sulfur trioxid, which consists in oxidizing sulfur dioxid by the action of an oxid of nitrogen and carbon dioxid.

21. The process, which consists in oxidizing a substance which, upon oxidation, will form sulfur trioxid, by the combined action of nitrogen tetroxid and carbon dioxid.

22. The process of making sulfur trioxid, which consists in oxidizing sulfur dioxid by the combined action of nitrogen tetroxid and carbon dioxid.

23. The process, which consists in oxidizing a substance which, upon oxidation, will form sulfur trioxid, while supplying carbon dioxid thereto.

In witness whereof I affix my signature in presence of two witnesses.

HENRY SPENCER BLACKMORE.

Witnesses:
H. N. JENKINS,
C. C. WRIGHT.